UNITED STATES PATENT OFFICE.

WILTON C. DONN, OF WASHINGTON, DISTRICT OF COLUMBIA, (ADMINISTRATOR OF HENRIK GAHN, DECEASED,) ASSIGNOR TO CHARLES G. AM ENDE, OF HOBOKEN, NEW JERSEY.

IMPROVEMENT IN COMPOSITIONS FOR PRESERVING ANIMAL MATTER.

Specification forming part of Letters Patent No. 172,728, dated January 25, 1876; application filed October 20, 1875.

*To all whom it may concern:*

Be it known that HENRIK GAHN, deceased, formerly of Upsala, Kingdom of Sweden, (WILTON C. DONN, of Washington, D. C., administrator,) invented an Improved Composition for Preserving Dead Bodies and other Animal Matter, of which the following is a specification:

This invention relates to a new composition, by which all kinds of animal matter—such as dead bodies, meats, &c.—may be preserved for a long time, and in a warm climate.

The invention consists in compounding boracic acid and saltpeter, in the proportion of about one part of boracic acid to one part of saltpeter; but the proportion of saltpeter may be increased tenfold, according to the kind of animal matter to be preserved, the climate, and the object of preservation.

The saltpeter of the composition may be more or less replaced by salt.

The above composition can be used in a dry state, or dissolved in water. When dry it is sprinkled as a powder over the matter to be preserved, or rubbed into the same.

If the composition is used in a liquid state the matter to be preserved is steeped into the same for a suitable length of time; but if the composition is used in the dry state the animal matter is, by preference, afterward steeped in a brine or similar substance, which will prevent air from reaching the preserved substance.

I am aware that in the Patent No. 99,240, of January 25, 1870, a composition of boracic acid, saltpeter, and sulphite of soda is described for preserving butter; but said composition, by virtue of the sulphite of soda contained in it, differs materially from that herein described. The taste imparted by the sulphite of soda would, moreover, render meat and vegetables unpalatable, and render the remaining ingredients, as well as the matter to be preserved, useless.

Butter can be washed to remove the sulphite of soda; but meat and vegetables cannot, in like manner, be liberated from said substance when once it has entered the pores.

I claim as the invention of HENRIK GAHN, deceased—

The composition of boracic acid and saltpeter, as and for the purpose described.

WILTON C. DONN,
*Administrator of Henrik Gahn, deceased.*

Witnesses:
S. A. FERRY,
EDW. W. DONN.